June 13, 1967 L. J. BANASZAK ETAL 3,325,121
AIRBORNE VEHICLE WITH VORTEX VALVE CONTROLLED
BY LINEAR ACCELEROMETER TO COMPENSATE FOR
VARIATIONS IN AERODYNAMIC DRAG
Filed July 30, 1964
FIG. 1
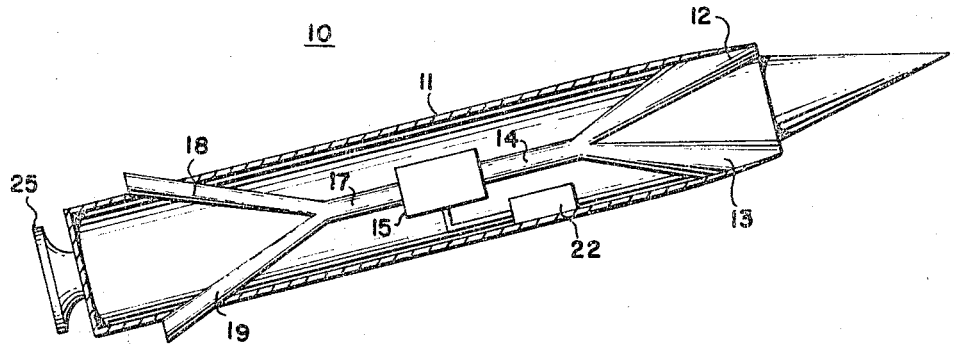
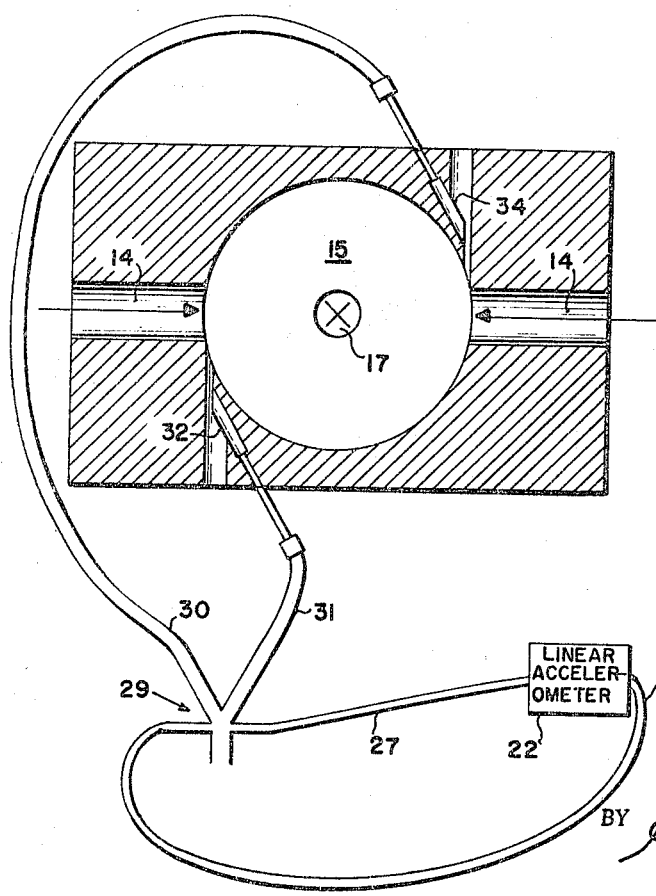
FIG. 2
INVENTOR.
LLOYD J. BANASZAK
MARIO PEREZ JR.
BY
ATTORNEY

United States Patent Office 3,325,121
Patented June 13, 1967

3,325,121
AIRBORNE VEHICLE WITH VORTEX VALVE CONTROLLED BY LINEAR ACCELEROMETER TO COMPENSATE FOR VARIATIONS IN AERODYNAMIC DRAG
Lloyd J. Banaszak, Wayzata, and Mario Perez, Jr., Brooklyn Park, Minn., assignors to Honeywell Inc., Minneapolis, Minn., a corporation of Delaware
Filed July 30, 1964, Ser. No. 386,289
5 Claims. (Cl. 244—3.22)

This invention relates generally to acceleration devices for controlling the drag on a missile in a longitudinal direction or along its longitudinal axis.

It is a primary object of this invention to provide an acceleration device which upon operation controls the longitudinal drag on the missile or vehicle to maintain a substantially constant drag in effect in forward flight on the missile and in effect force the missile to follow a substantially vacuum trajectory. Thus, in each case a vehicle so controlled would follow a gravity turn trajectory, as in a vacuum.

Heretofor systems have been constructed embodying a principal to eliminate the effect of aerodynamic drag and force a missile to follow a vacuum trajectory or gravity trajectory. One such manner of eliminating the aerodynamic drag, in a sense, is to continually balance thrust and drag by varying the thrust of a throttleable sustainer engine, wherein the thrust may be controlled by a linear accelerometer. In another method a constant thrust sustainer engine propels the vehicle, and to control the drag, mechanical drag brakes, that is exterior aerodynamic surfaces which could be extended or retracted from the outer surface of the vehicle, are provided. In both of the above arrangements a longitudinal accelerometer exerts a control either on the sustainer engine or on the drag brake to null the accelerometer output.

An object of the present invention is to use a fluid system instead of aerodynamic surfaces for varying the forward or longitudinal resistance of the vehicle.

It is a further object of this invention to utilize a fluid system in place of the mechanical drag brake to control longitudinal acceleration so that the vehicle will follow a gravity turn in flight.

The above and other objects of the invention will become apparent from a reference to the accompanying specification in conjunction with the subjoined drawings in which:

FIGURE 1 is a cross-sectional view of a vehicle to which the novel resistance control apparatus is applied;

FIGURE 2 is an illustration of the fluid control system, for varying longitudinal resistance, in detail.

According to the invention, the missile which may be an ordnance-type vehicle such as used in surface to surface operations is provided with an internal ductwork for passage of air therethrough. The front of the vehicle is provided with intake air scoops connecting with the internal duct system, and the vehicle is provided with air exhaust ducts at the rear connecting with the internal duct system. The air passes from the forward air scoops through a vortex valve and exhausts through the rear exhaust ducts. The flow through the internal ductwork from the intake to the exhaust ports is controlled by an automatically adjusted vortex type valve of the fluid type having no moving parts, whereby the passage of air through the ductworks may be variable resisted to thereby alter the forward or longitudinal resistance of the vehicle. The vehicle is provided with a conventional sustainer engine which develops sufficient thrust to propel the vehicle.

Referring to FIGURE 1, the vehicle 10 has a body portion or outer surface 11. At the front end of the body portion 11 are air inlet scoops 12, 13, communicating with an internal main duct 14. The air through duct 14 passes to a vortex valve 15 and thence through the exhaust duct 17 of vortex valve 14 to the air exhaust ducts 18, 19 of the vehicle.

The vortex valve is of the fluid operated type and the change in resistance to the passage of fluid such as air through the vortex valve 15 is controlled by an accelerometer 22 sensing longitudinal accelerations of vehicle 10.

Such vehicle 10 may be launched at sea level where the air has its maximum density and thus has its greatest resistance to forward flight. At this time the vortex valve 15 is fully opened so that the primary resistance to the passage of the vehicle 10 through the air is from the frictional resistance of exterior surface 11 of the vehicle. However, as altitude is gained by the vehicle, the aerodynamic and frictional resistance decreases so that the vehicle encounters less forward resistance. This decrease in forward resistance with no change in the thrust of the sustainer engine 25 results in a forward or longitudinal acceleration that is sensed by accelerometer 22. Accelerometer 22 increases the impedance or resistance to flow of the air through scoops 12, 13 to exhaust ports 18, 19 thereby nulling the accelerometer and maintaining the over-all resistance of the vehicle to forward flight at a substantially constant value.

Referring to FIGURE 2, for details of the control system, the body 11 of the vehicle 10 houses a vortex valve 15 of the fluid type. In such a valve, fluid such as air through ducts 14, 14 enters at the periphery of the valve and passes out axially through passage 17 at the center. Under normal conditions the flow is basically radial in character from the ducts 14 to the outlet passage 17.

Vortex flow or flow having a circular motion may be applied to the inflow to increase the resistance to the passage of the fluid through the vortex valve 15.

This control is provided by accelerometer 22 which is of the fluid type and it may be such as that disclosed in a prior application of Harvey D. Ogren, Ser. No. 276,104 filed Apr. 25, 1963, which utilized a balance member subject to fluid flow and providing a differential pressure signal. Accelerometer 22 is responsive to the longitudinal accelerations of the vehicle 10 and upon existence of such acceleration a differential pressure results in accelerometer output pressure lines 27, 28. Lines 27, 28 connect to a fluid amplifier 29. Fluid amplifier 29 is of the conventional proportional type which has its outputs connected by conduits 30, 31 to vortex flow control nozzles 32, 34 of vortex valve 15. The linear accelerometer 22, the proportional fluid amplifier 29, and the vortex valve 15 are not new herein and only general details thereof consequently have been supplied above.

*Operation*

The equations governing this vehicle in motion are stated below.

The equations of motion of a rocket are:

$$\begin{pmatrix} \dot{U} \\ \dot{V} \\ \dot{W} \end{pmatrix} = \begin{Bmatrix} \frac{F_x}{m} \\ \frac{F_y}{m} \\ \frac{F_z}{m} \end{Bmatrix} - \begin{pmatrix} 0 & -R & Q \\ R & 0 & -P \\ -Q & P & 0 \end{pmatrix} \begin{pmatrix} U \\ V \\ W \end{pmatrix} + (a) \begin{pmatrix} 0 \\ 0 \\ G \end{pmatrix}$$

($a$) is the direction cosine matrix $$\begin{pmatrix} \dot{X}_G \\ \dot{Y}_G \\ \dot{Z}_G \end{pmatrix} = (a^{-1}) \begin{pmatrix} U \\ V \\ W \end{pmatrix}$$

differentiating $$\begin{pmatrix} \ddot{X}_G \\ \ddot{Y}_G \\ \ddot{Z}_G \end{pmatrix} = (\dot{a}^{-1}) \begin{pmatrix} U \\ V \\ W \end{pmatrix} + a^{-1} \begin{pmatrix} \dot{U} \\ \dot{V} \\ \dot{W} \end{pmatrix}$$

but $$(\dot{a}^{-1}) = (a^{-1}) \begin{pmatrix} 0 & -R & Q \\ R & 0 & -P \\ -Q & P & 0 \end{pmatrix}$$

so $$\begin{pmatrix} \ddot{X}_G \\ \ddot{Y}_G \\ \ddot{Z}_G \end{pmatrix} = (a^{-1}) \begin{pmatrix} 0 & -R & Q \\ R & 0 & -P \\ -Q & P & 0 \end{pmatrix} \begin{pmatrix} U \\ V \\ W \end{pmatrix} + a^{-1} \begin{pmatrix} F_x/m \\ F_y/m \\ F_z/m \end{pmatrix} -$$

$$- a^{-1} \begin{pmatrix} 0 & -R & Q \\ R & 0 & -P \\ -Q & P & 0 \end{pmatrix} \begin{pmatrix} U \\ V \\ W \end{pmatrix} + \begin{pmatrix} 0 \\ 0 \\ G \end{pmatrix}$$

or after cancelling $$\begin{pmatrix} \ddot{X}_G \\ \ddot{Y}_G \\ \ddot{Z}_G \end{pmatrix} = \frac{1}{m} a^{-1} \begin{pmatrix} F_x \\ F_y \\ F_z \end{pmatrix} + \begin{pmatrix} 0 \\ 0 \\ G \end{pmatrix}$$

If instantaneous weathercocking is assumed, $F_y = F_z = 0$. If thrust is held exactly equal to drag, $F_x = 0$. Then $$\begin{pmatrix} \ddot{X}_G \\ \ddot{Y}_G \\ \ddot{Z}_G \end{pmatrix} = \begin{pmatrix} 0 \\ 0 \\ G \end{pmatrix}$$

Which is simply the gravity term. U, V, W are body axis velocities. P, Q, R are body axis angular rates. X, Y, Z are positions along inertial axes. $F_x$, $F_y$, $F_z$ are any forces along the body axes.

It will be appreciated that the sustainer engine 25 develops substantially constant thrust following launch of the vehicle 10. As the aircraft or vehicle follows its trajectory, any tendency for it to accelerate along the longitudinal axis is sensed by the accelerometer 22. An increase in forward acceleration that is sensed by the accelerometer 22 causes fluid amplifier 29 and nozzles 32, 34 to cause vortex flow action to be applied to the normal radial flow from inlet lines 14 to exhaust line 17 of vortex valve 15 thereby increasing the impedance or resistance to the flow of air through the vortex valve. Thus with the resistance increased the acceleration of the vehicle is reduced or nulled and the vehicle follows the gravity turn trajectory similar to that of a missile in a vacuum. The arrangement will include some means for "turning on" the control system from the accelerometer 22 after launch of the vehicle. For example, this could be effected by preventing the normal flow through the accelerometer 22 until launch is effected.

What is claimed is:

1. In an airborne vehicle having an internal duct system receiving air through intake ports within the external shell at the front of the vehicle and exhausting air at the rear of the vehicle, a vortex valve in said duct system receiving the air at its circumference as it passes from front to rear of the vehicle and exhausting it by radial flow at its center, a linear accelerometer responsive to longitudinal accelerations of the vehicle producing a signal in accordance therewith, and means controlling the vortex valve from said signal to vary the radial flow and thus resistance to flow of the air through the valve and thus increase the resistance of such flow, to compensate for variations in aerodynamic drag of the vehicle whereby it follows a trajectory involving substantially constant forward resistance.

2. In an airborne vehicle having an internal duct system communicating with the atmosphere at the front of the vehicle and at the rear of the vehicle, a vortex valve in said duct system receiving the air as it passes from the front of the vehicle to the rear, a fluid type linear accelerometer responsive to longitudinal accelerations of the vehicle producing a signal in accordance therewith; means controlling the flow through said vortex valve by causing vortex action from said signal to thereby null said signal.

3. In a moving vehicle, a vortex valve normally radially passing fluids from an inlet port to an exhaust port and having vortex flow control ports, and means responsive to acceleration of said vehicle effective on said control ports to cause vortex flow, to increase the resistance to flow of the fluid through said valve.

4. The apparatus of claim 3 wherein said accelerometer is of the fluid type and provides a differential fluid pressure signal in accordance with the magnitude of the acceleration.

5. In an airborne vehicle, apparatus for controlling the total drag thereof comprising: means for guiding air through confined passages from the front of said vehicle to the back of the vehicle; a valve in said guiding means passing air therethrough in a normal radial direction during constant drag condition; and means responsive to change in drag of said vehicle causing non-radial flow of fluid through said valve to return the drag of said vehicle to its constant value.

References Cited

UNITED STATES PATENTS

| | | | |
|---|---|---|---|
| 2,719,683 | 10/1955 | Jones | 244—113 X |
| 3,184,182 | 5/1965 | May et al. | 102—50 X |
| 3,195,303 | 7/1965 | Widell | 60—35.54 |
| 3,205,820 | 9/1965 | McCorkle et al. | 102—50 X |

BENJAMIN A. BORCHELT, *Primary Examiner.*

V. R. PENDEGRASS, *Assistant Examiner.*